United States Patent [19]
Lovell

[11] 3,951,375
[45] Apr. 20, 1976

[54] BALANCED RUNNER SYSTEM FOR INJECTION MOLDING APPARATUS

[75] Inventor: Peter John Lovell, Kingston, Canada

[73] Assignee: Du Pont of Canada, Ltd., Montreal, Canada

[22] Filed: July 2, 1974

[21] Appl. No.: 485,083

[30] Foreign Application Priority Data
July 13, 1973 Canada.............................. 176438

[52] U.S. Cl................................ 249/107; 425/248; 425/DIG. 229
[51] Int. Cl.² .......................................... B29F 1/04
[58] Field of Search ........... 425/247, 248, 249, 250, 425/DIG. 229; 249/107, 110

[56] References Cited
UNITED STATES PATENTS

| | | | |
|---|---|---|---|
| 2,459,048 | 1/1949 | Schwartz et al. .................... | 425/247 |
| 2,578,492 | 12/1951 | Simpkins et al. ..................... | 249/96 |
| 2,672,653 | 3/1954 | Simpkins et al. .................... | 425/250 |
| 3,093,865 | 6/1963 | Peter et al. .......................... | 425/250 |
| 3,533,594 | 10/1970 | Segmuller .......................... | 249/110 |
| 3,661,487 | 5/1972 | Susin.................................. | 425/247 |
| 3,669,598 | 6/1972 | Tucker................................ | 425/249 |
| 3,779,506 | 12/1973 | Adams................................ | 249/110 |
| 3,790,324 | 2/1974 | Susin.................................. | 425/247 |

FOREIGN PATENTS OR APPLICATIONS

| | | | |
|---|---|---|---|
| 875,061 | 6/1971 | Canada............................... | 425/247 |

Primary Examiner—Francis S. Husar
Assistant Examiner—Carl Rowold

[57] ABSTRACT

A balanced runner system for injection moulding apparatus is disclosed. The runner system has an inlet, a plurality of runners and five gates. One of the gates is centrally located, the remaining gates being symmetrically spaced about the centrally located gate. The runners are such that the runner system is capable of supplying molten polymer to each gate at substantially the same rate. The runner system may be used to obtain a more uniform flow of molten polymer to a mould.

6 Claims, 2 Drawing Figures

BALANCED RUNNER SYSTEM FOR INJECTION MOLDING APPARATUS

FIELD OF THE INVENTION

The present invention relates to a runner system for injection moulding apparatus and in particular to a runner system capable of providing a more uniform flow of molten polymer to a mould during an injection moulding process.

BACKGROUND

In the injection moulding of molten polymers, for example polyethylene, the flow of the polymer into the mould may be an important factor in the manufacture of articles of acceptable properties. Techniques for controlling the flow of molten polymer into a mould are known, for example B. Segmuller, in U.S. Pat. No. 3,533,594 which issued 13th Oct., 1970, describes a hot runner system having branched runner means distributed in at least two planes and in which the lengths of the branched runners between the inlet to the runner system and the moulds are substantially equal. Control of the flow of molten polymer in a runner system attached to a plurality of moulds is important for the uniform filling of the moulds with polymer, uniform filling of the moulds being an important factor in the production of acceptable moulded articles of consistent properties. Similarly, if the runner system is attached to a mould at more than one location, i.e., if the mould has more than one gate, control of the flow of molten polymer in the runner system is important for the uniform filling of the mould with polymer. If the mould is not uniformly filled with polymer the resultant moulded article may be in a stressed condition and the article may warp to reduce the effect of the stresses moulded into the article. For example, in the moulding of an article, e.g. a box, in a mould having four gates located so as to form a square or a rectangle, processing problems may be encountered. Such problems may include entrapment of air, formation of voids and/or creation of regions of stress in the moulded article at points within the location of the four gates.

Injection moulding runner systems capable of providing a uniform flow of molten polymer to a mould, herein referred to as balanced runner systems, and especially runner systems capable of providing a uniform flow of molten polymer to a multi-point gated mould, are therefore desirable. Balanced runner systems and multi-point gating systems are discussed by J. S. Walker and E. R. Martin in "Injection Moulding of Plastics" 2nd Ed., The plastics Institute, Iliffe Books, London, England, especially on pages 99 and 108–109.

A runner system capable of providing a more uniform flow of molten polymer to a mould, and in particular, such a runner system for a five-gated mould, has now been found.

SUMMARY OF THE INVENTION

Accordingly, the present invention provides a balanced runner system for injection moulding apparatus comprising an inlet, a plurality of runners and five gates, one gate being centrally located with the remaining gates being symmetrically spaced about said centrally located gate, the inlet being connected to said gates by a plurality of runners having lengths and cross-sections such that the runner system is capable of supplying molten polymer to each gate at substantially the same rate.

In an embodiment the present invention provides a balanced runner system for injection moulding apparatus comprising an inlet, a plurality of runners and five gates, one gate being centrally located with the remaining gates being symmetrically spaced about said centrally located gate, the inlet being connected to two primary runners having the same cross-sections, each of said primary runners being connected to the centrally located gate and two other gates by means of secondary runners having uniform cross-sections, said runners having lengths and cross-sections such that the runner system is capable of supplying molten polymer to each gate at substantially the same rate, said runner system being symmetrical about the centrally located gate.

In a preferred embodiment the five gates of the runner system of the present invention are all attached to the same mould.

In a further embodiment the runner system is symmetrical about at least one plane through the centrally located gate.

In another embodiment the cross-section of the runners is approximately circular.

In a still further embodiment the secondary runners of the runner system are linear.

In yet another embodiment the runner system is a hot runner system or an insulated runner system.

DESCRIPTION OF THE DRAWINGS

The balanced runner system of the present invention may be illustrated by the embodiments shown in the drawings in which:

FIG. I is a schematic representation of one embodiment of the balanced runner system of the present invention.

Figure 1:
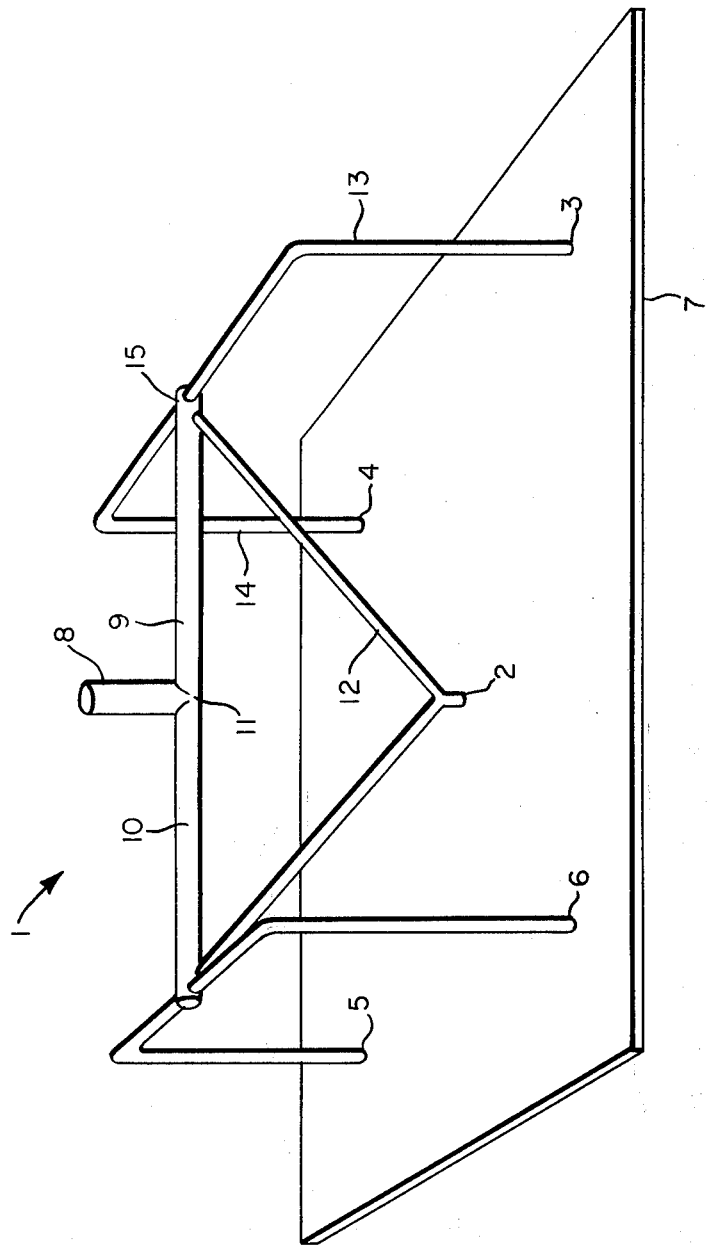
Figure 2:
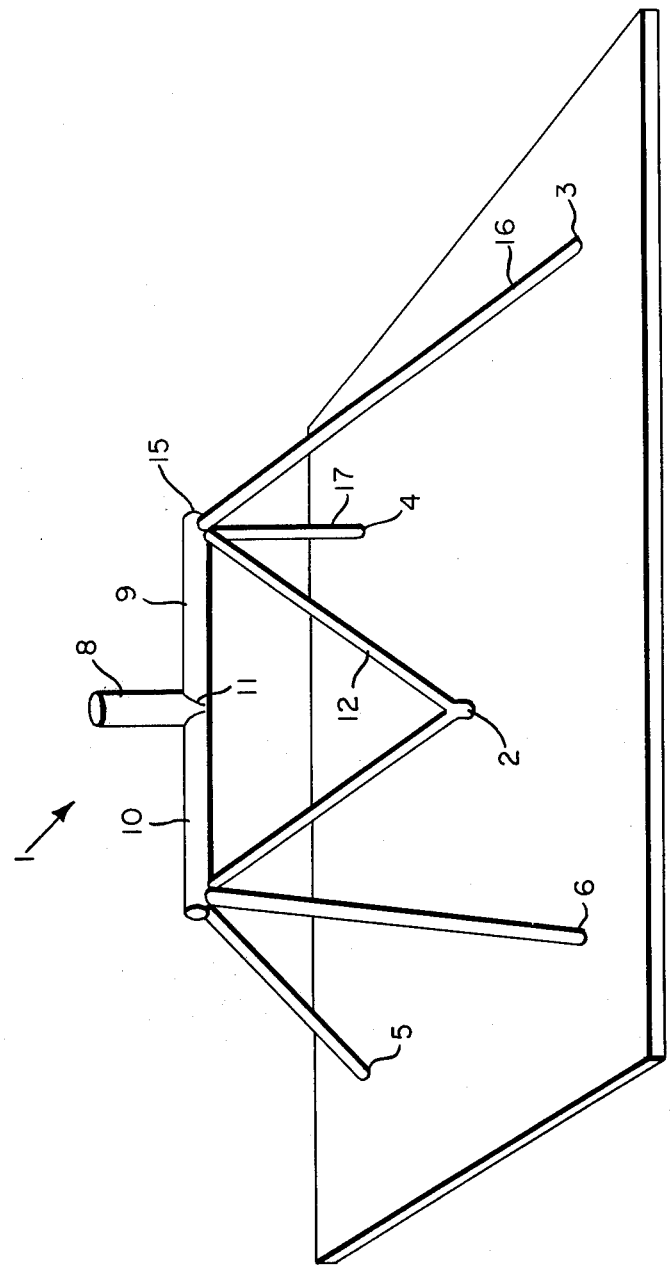

FIG. II is a schematic representation of a second embodiment of the balanced runner system of the present invention.

DESCRIPTION OF THE INVENTION

Referring to FIG. I the runner system indicated generally by 1 is attached by gates, indicated by 2–6, to plate 7. Plate 7 forms part of a mould (not shown). In the embodiment shown gates 3–6 are positioned at the corners of a rectangle and gate 2 is positioned at the intersection of the diagonals of the rectangle, all gates being identical. Gate 2 may be referred to herein as the centrally located gate. Inlet 8 located above gate 2 is connected to primary runners 9 and 10 at junction 11. Primary runners 9 and 10 are co-axial tubes of the same cross-sectional area and are parallel to the plane of plate 7. Primary runner 9 is connected with secondary runners 12, 13 and 14 at junction 15. Secondary runner 12 connects junction 15 to gate 2 and is linear. Secondary runners 13 and 14 connect junction 15 with gates 3 and 4 respectively. In the embodiment shown the sections of secondary runners 13 and 14 adjacent to junction 15 are coplanar with primary runner 9 while the sections of secondary runners 13 and 14 adjacent to gates 3 and 4 are at right angles to the plane of plate 7. Secondary runners 13 and 14 thus contain a right angle. The runner system is symmetrical about gate 2, primary runner 10 thus being connected to gates 2, 5 and 6 in the same manner as primary runner 9 is connected to gates 2, 3 and 4.

The embodiment shown in FIG. II differs from that shown in FIG. I in that primary runners 13 and 14 (designated as 16 and 17 in FIG. II) connecting junction 15 to gates 3 and 4 respectively are linear throughout their length, i.e., no section of primary runners 16 and 17 is parallel to or vertical to the plane of plate 7, as in the embodiment of FIG. I.

Although in the figures primary runners 9 and 10 have been shown to be parallel to the plane of plate 7, in one embodiment of the invention these runners may slope downwardly towards plate 7; in such cases primary runners 9 and 10 would not be co-axial. In other embodiments secondary runner 12 may be connected with primary runner 9 at a point away from junction 15 and/or the two secondary runners shown in the figures as being connected to gate 2 may be connected at a point away from gate 2 with a suitable runner connecting gate 2 to the junction of the secondary runners. The configuration of the runners is an important factor in the design of the runner systems.

In a preferred embodiment of the present invention the runners are of substantially circular cross-section.

In the operation of the runner systems disclosed in FIG. I and FIG. II, molten polymer is injected under pressure through inlet 8 into primary runners 9 and 10. The molten polymer flows under the influence of pressure through primary runners 9 and 10, through the secondary runners (e.g. 12, 13, 14, 16 and 17) to all of gates 2–6. As a result of the design of the runner system the flow of polymer to all of gates 2–6 is substantially equal.

The runner system of the present invention is designed so that polymer is supplied to each of the five gates at substantially the same rate. Ideally the runner system would be designed so that the distance from the inlet to each of the gates was the same and so that the total cross sectional area of the runners attached to each gate was the same. The cross sectional area of the primary runners, shown in the embodiments of FIG. I and II, should therefore be at least as great as the total cross sectional area of the secondary runners attached thereto. However, in designing a runner system of the present invention consideration must be given to the effects of factors known to be important in determining the flow of viscous liquids in tubes. Of particular importance in the present case is the effect of solidified or highly viscous polymer at or near the walls of the runners. Such polymer may significantly reduce the effective cross sectional area of the runner through which the molten polymer must flow. The effects of such polymer are likely to be significantly greater for runners of small cross sectional area.

The runner system of the present invention may, for example, be a hot runner system or an insulated runner system, hot runner and insulated runner systems being well known. The runner system must, of course, be designed to be operated as a particular type of runner system, especially as the layer of solidified or highly viscous polymer may be thicker in, for example, an insulated runner system. Hot probes and other techniques known in the art may be used in runners of the present invention.

EXAMPLE

A balanced hot runner system similar to that shown in FIG. I except that the primary runners, designated 9 and 10 in FIG. I, contained a right angle bend in the direction of the plate 7 of the mould prior to junction 15, was fabricated. The primary runner was 0.75 in. in diameter, the secondary runners to the centrally located gate were 0.434 in. in diameter and the secondary runners to the remaining gates were 0.5 in. in diameter. The distance from the inlet to the centrally located gate was 21.88 in. and to the remaining four gates was 17.63 in.

A food box such as those used in grocery stores was moulded from Sclair 2908 high density polyethylene resin on a commercial injection moulding machine equipped with the above hot runner system. The melt temperature of the polymer was about 425°F. The food box so moulded had excellent physical properties and exhibited minimal warpage.

Food boxes were injection moulded using the same resin and a similar mould but using a four gate hot runner system and a single central gate runner system. The food boxes had generally good physical properties but exhibited significant warpage and lower impact strength. These food boxes were inferior to the food boxes moulded using the balanced hot runner system of the present invention.

I claim:

1. A balanced runner system for injection molding apparatus comprising an inlet, a plurality of runners and five gates attached to the same mold having a single cavity, one gate being centrally located with the remaining gates being symmetrically spaced in two dimensions about said centrally located gate, the inlet being connected to said gates by a plurality of runners having lengths and cross-sections such that the runner system is capable of supplying molten polymer to each gate at substantially the same rate and of providing a uniform flow of molten polymer to the mold.

2. The balanced runner system of claim 1 in which the runner system is symmetrical about at least one plane through the centrally located gate.

3. A balanced runner system for injection molding apparatus comprising an inlet, a plurality of runners and five gates attached to the same mold having a single cavity, one gate being centrally located with the remaining gates being symmetrically spaced in two dimensions about said centrally located gate, the inlet being connected to two primary runners having the same cross-sections, each of said primary runners being connected to the centrally located gate and two other gates of secondary runners having uniform cross-sections such that the runner system is capable of supplying molten polymer to each gate at substantially the same rate and of providing a uniform flow of molten polymer to the mold, said runner system being symmetrical about the centrally located gate.

4. The balanced runner system of claim 3 in which the cross-section of the runners is approximately circular.

5. The balanced runner system of claim 3 in which the secondary runners are linear.

6. The balanced runner system of claim 3 in which the distance from the inlet to each gate is the same.

* * * * *